US012088039B2

(12) United States Patent
Gentile et al.

(10) Patent No.: US 12,088,039 B2
(45) Date of Patent: Sep. 10, 2024

(54) SEAL ARRANGEMENT OF A PLUG-IN CONNECTION FOR ESTABLISHING ELECTRICAL CONNECTIONS AND A DEVICE FOR DRIVING A COMPRESSOR WITH THE SEAL ARRANGEMENT

(71) Applicant: Hanon Systems, Daejeon (KR)

(72) Inventors: Andrea Gentile, Euskirchen (DE); Eric Rooks, Bonn (DE); Oliver Gormanns, Mönchengladbach (DE)

(73) Assignee: HANON SYSTEMS, Daejeon (KR)

( * ) Notice: Subject to any disclaimer, the term of this patent is extended or adjusted under 35 U.S.C. 154(b) by 356 days.

(21) Appl. No.: 17/596,757

(22) PCT Filed: Oct. 27, 2020

(86) PCT No.: PCT/KR2020/014693
§ 371 (c)(1),
(2) Date: Dec. 17, 2021

(87) PCT Pub. No.: WO2021/096102
PCT Pub. Date: May 20, 2021

(65) Prior Publication Data
US 2022/0278481 A1 Sep. 1, 2022

(30) Foreign Application Priority Data

Nov. 13, 2019 (DE) ...................... 10 2019 130 582.9

(51) Int. Cl.
*H01R 13/52* (2006.01)
*B60H 1/32* (2006.01)
(Continued)

(52) U.S. Cl.
CPC ....... *H01R 13/5202* (2013.01); *B60H 1/3222* (2013.01); *H01R 13/66* (2013.01); *H01R 13/748* (2013.01); *H02K 5/225* (2013.01)

(58) Field of Classification Search
CPC .... H01R 13/52; H01R 13/5205; H01R 13/66; H01R 13/748; H02K 5/225; B60H 1/3222
(Continued)

(56) References Cited

U.S. PATENT DOCUMENTS 6,305,975 B1 * 10/2001 Steiner ............... H01R 13/5202
174/18
8,147,272 B2 * 4/2012 Rhein ............... H01R 13/5202
439/556
(Continued)

FOREIGN PATENT DOCUMENTS

CN 106207597 A 12/2016
CN 106953196 A 7/2017
(Continued)

*Primary Examiner* — Harshad C Patel
(74) *Attorney, Agent, or Firm* — James D. Miller; Shumaker, Loop & Kendrick, LLP

(57) ABSTRACT

A seal arrangement for a plug-in connector for establishing electrical connections via a housing, in particular a device for driving a compressor. The seal arrangement exhibits a mounting element to accommodate plug-in connectors for transmitting electrical energy and data, and a sealing element located between the housing and the mounting element. The mounting element is designed with a flange with a sealing surface facing in the direction of the housing. The sealing surface of the flange thus exhibits a first contour and the housing exhibits a second contour in the area of the location of the sealing surface surrounding a pass-through opening.

16 Claims, 2 Drawing Sheets

(51) Int. Cl.
*H01R 13/66* (2006.01)
*H01R 13/74* (2006.01)
*H02K 5/22* (2006.01)

(58) Field of Classification Search
USPC ............................................ 439/587
See application file for complete search history.

(56) References Cited

U.S. PATENT DOCUMENTS

| | | | |
|---|---|---|---|
| 8,562,377 B2* | 10/2013 | Kawamura | H01R 13/5205 |
| | | | 439/607.44 |
| 8,738,097 B2 | 5/2014 | Hong | |
| 8,979,554 B2 | 3/2015 | Yudate | |
| 9,287,653 B2* | 3/2016 | Endo | H01R 12/00 |
| 9,825,398 B1 | 11/2017 | Uchida et al. | |
| 9,991,625 B2* | 6/2018 | Ozaki | H01R 13/5202 |
| 10,038,287 B2* | 7/2018 | Yamada | H01R 13/5202 |
| 10,050,377 B2* | 8/2018 | Matsuura | H01R 13/741 |
| 10,360,021 B2* | 7/2019 | Pereira Cabral | G06F 8/65 |
| 11,444,409 B2* | 9/2022 | Masuda | H01R 13/5202 |
| 2009/0149048 A1 | 6/2009 | Pavlovic et al. | |
| 2013/0084728 A1* | 4/2013 | Omae | H01R 4/646 |
| | | | 439/271 |
| 2014/0030921 A1* | 1/2014 | Kobayashi | H01R 13/748 |
| | | | 439/607.01 |
| 2014/0038459 A1* | 2/2014 | Kobayashi | H01R 13/6593 |
| | | | 439/607.41 |
| 2014/0370753 A1* | 12/2014 | Kobayashi | H01R 13/5216 |
| | | | 439/607.41 |
| 2015/0099385 A1* | 4/2015 | Ikeya | H01R 12/7005 |
| | | | 439/271 |
| 2018/0151984 A1 | 5/2018 | Listing et al. | |
| 2019/0331120 A1* | 10/2019 | Guntermann | F04B 17/03 |
| 2021/0210876 A1* | 7/2021 | Watanabe | H01R 9/223 |
| 2021/0273372 A1* | 9/2021 | Nishitani | H01R 13/5202 |
| 2022/0052496 A1* | 2/2022 | Hoffmann | H01R 13/707 |
| 2022/0131309 A1* | 4/2022 | Oomori | H01R 13/6272 |

FOREIGN PATENT DOCUMENTS

| | | |
|---|---|---|
| JP | 2012160445 A | 8/2012 |
| WO | 2011125645 A1 | 10/2011 |
| WO | 2013186683 A1 | 12/2013 |
| WO | 2019166426 A1 | 9/2019 |

* cited by examiner

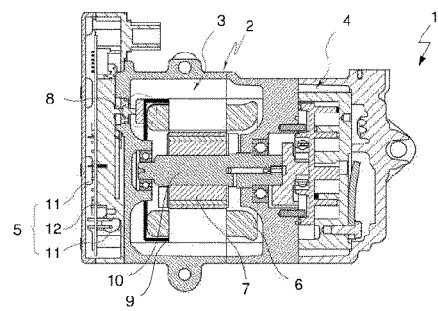
Fig. 1
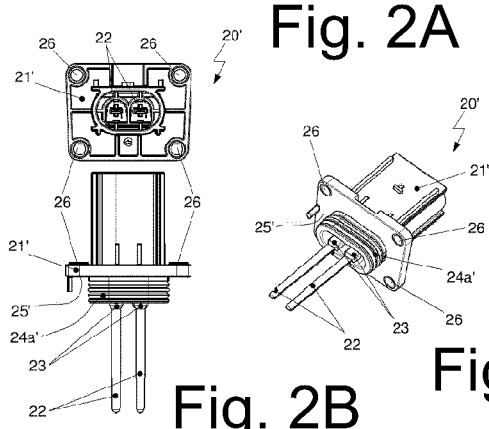
Fig. 2A
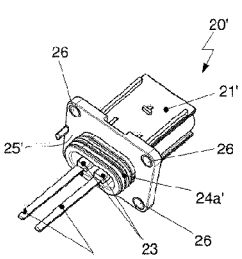
Fig. 2C
Fig. 2B
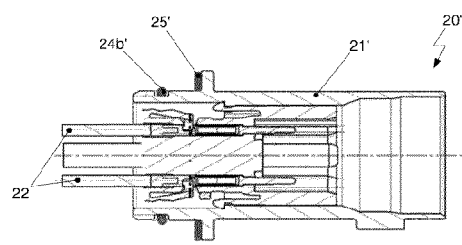
Fig. 3
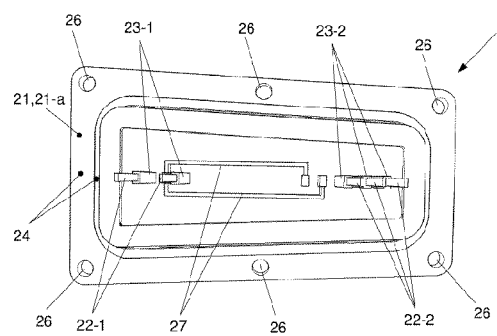
Fig. 4

SEAL ARRANGEMENT OF A PLUG-IN CONNECTION FOR ESTABLISHING ELECTRICAL CONNECTIONS AND A DEVICE FOR DRIVING A COMPRESSOR WITH THE SEAL ARRANGEMENT

CROSS-REFERENCE TO RELATED PATENT APPLICATIONS

This patent application is a United States national phase patent application based on PCT/KR2020/014693 filed on Oct. 27, 2020, which claims the benefit of German Patent Application No. 10 2019 130 582.9 filed on Nov. 13, 2019, the entire disclosures of which are hereby incorporated herein by reference.

TECHNICAL FIELD

The present invention relates to a seal arrangement for establishing electrical connections using a housing, in particular a device for driving a compressor, such as an electric motor, especially for compressing a vaporous fluid, for example a refrigerant. The seal arrangement exhibits a mounting element to accommodate plug-in connectors for transmitting electrical energy and data, and a sealing element located between the housing and the mounting element. The mounting element is designed with a flange with a sealing surface facing in the direction of the housing.

The invention further relates to a device for driving a compressor, in particular an electric motor, with the seal arrangement for establishing electrical connections and a method for mounting the seal arrangement on the device for driving the compressor. The compressor may be used within the refrigerant circuit of a motor vehicle air conditioning system.

BACKGROUND ART

Compressors for mobile applications, in particular for air conditioning systems in motor vehicles, for conveying refrigerant through a refrigerant circuit, also known as refrigerant compressors, as known from the state of the art are often designed as piston compressors with variable displacement volume or as scroll compressors independent of the type of refrigerant. The compressors are driven either by a pulley or electrically.

An electrically driven compressor exhibits an electric motor to drive the respective compression mechanism in addition to an inverter to drive the electric motor. The inverter is used to convert direct current from a vehicle battery into three-phase current, which is fed to the electric motor via electrical connections.

The inverter has plug connections for plug-in connectors designed as pins for electrical connection to terminals of the electric motor, which in turn are electrically connected to connecting lines of conducting wires for the coils of the stator. The connections of the electric motor are arranged in a connector housing which is located on a front side of the stator aligned in the axial direction of the stator.

Conventionally, electrically driven compressors are designed with a plug-in connector for connections transmitting electrical energy that are connected to the housing via screw connections and with two sealing elements, in particular an axial seal and a radial seal.

The demands for protection against corrosion, especially in the case of automotive components, are very high. A seal known from the state of the art, which is in contact with a housing made of a metal, can only delay the surface migration of corrosive substances, especially into the interior of the housing, for a certain amount of time. Well-known seals, for example 0-ring seals, molded seals or flat gaskets can no longer meet the increasing demands placed upon them.

An axial seal is provided in addition to the radial seal in order to improve sealing properties and, for example, to protect electronic components of the inverter more effectively against moisture. The plug-in connectors therefore have a radial seal or an axial seal or a combination of both or more seals.

Housings made of higher quality metal alloys can withstand longer exposure, but are very expensive.

DE 10 2012 105 065 A1 shows a seal, a connector housing and a plug-in connector. The seal is designed with a mounting element open on both sides, which passes through the seal in one direction of insertion and on one end of which, aligned in the direction of insertion, a sealing flange is arranged surrounding the mounting element. The sealing flange is designed with axial sealing surfaces pointing in the direction of insertion. The plane created in the mounting element is perpendicular to the insertion direction. The seal also exhibits a sealing collar with radial sealing surfaces extending away from the sealing flange and counter to direction of insertion. Locking elements are arranged on the sealing flange for locking the seal with the plug.

Both the axial sealing surface and the radial sealing surfaces are flat so that the migration path for corrosive substances along the sealing surfaces, and thus the service life or functional duration of the to-be-sealed device, is very limited.

The plug-in connectors known from the state of the art are also designed with a high number of components that require an extended assembly time. The potential installation space within the housing for the compressors, and consequently the installation space for the electrical plug-in connectors, is very limited. In addition, the plug-in connection comprising a large number of components requires high material costs, manufacturing costs and storage costs.

SUMMARY

The object of the invention is to provide a seal arrangement for a plug-in connection for establishing electrical connections for a device for driving an electrically driven compressor of a vaporous fluid, in particular an electric motor, which meets the high demands of corrosion resistance, can be installed in a simple manner and thus saves time. The seal arrangement is intended to have the fewest possible number of individual components and is intended to be easy to realize in order to minimize production costs. The seal arrangement is intended to maximize the life cycle or functional life of the device to be sealed using the seal arrangement.

The problem is solved by the subject matter with the characteristics of the independent patent claims. Additional embodiments are described in the dependent patent claims.

The problem is solved by a seal arrangement according to the invention for establishing electrical connections via a housing, in particular a device for driving a compressor. The seal arrangement exhibits a plug-in connector with a mounting element to accommodate plug-in connectors for transmitting electrical energy and data, preferably in independent transmission ranges, in particular in different voltage ranges, and a sealing element located between the housing and the mounting element. The mounting element is designed with a flange with a sealing surface facing in the direction of the housing.

According to the design of the invention, the sealing surface of the flange exhibits a first contour and the housing exhibits a second contour in the area of the location of the sealing surface surrounding a pass-through opening, in each case in the form of at least one recess as well as a formation completely surrounding the pass-through opening. The contours arranged on the sealing surface and the housing are designed and arranged to correspond to each other.

The sealing element according to the invention comprising a combined axial seal and radial seal is designed with a first area operating in a radial direction, which completely encloses the mounting element in the radial direction, and a second area operating in an axial direction, as a single-piece component. The sealing element with the second area is located between the sealing surface of the flange with the first contour and the housing with the second contour.

The axial direction essentially refers to the longitudinal direction of the plug-in connectors or the plug-in connector. The radial direction is perpendicular to the longitudinal direction of the plug-in connectors and thus to the axial direction of the plug-in connector.

According to a further embodiment of the invention, the flange protrudes in radial direction from the mounting element, completely enclosing the mounting element. The sealing surface of the flange is thus arranged in a plane that extends in a radial direction and points in an axial direction towards the housing.

According to a preferred embodiment of the invention, the at least one recess of the contour is formed in the form of a groove with a depth aligned in the axial direction, while the at least one formation of the contour is arranged in the form of a raised part or edge protruding from the respective surface with a height aligned in the axial direction.

The recess and the mold of the respective contour are preferably arranged parallel to each other.

The second area of the sealing element is advantageously arranged to fill and seal a gap formed between the contours, in particular the recesses and formation corresponding to each other as tongue and groove. The second area of the sealing element is preferably designed as a labyrinth seal.

According to an advantageous embodiment of the invention, the sealing element is formed with an opening extending in the axial direction for receiving the mounting element.

The first area of the sealing element exhibits a hollow cylindrical wall aligned in the axial direction with a first end face and a second end face. When the plug-in connector is installed in the housing, the sealing element is arranged with the first area inside the pass-through opening of the housing between the mounting element and the housing, wherein an inner surface of the wall rests adjoins the mounting element as a first radial sealing surface in the radial direction, whilst an outer surface of the wall rests adjoins the housing as a second radial sealing surface.

A further advantage of the invention is that the second area of the sealing element is essentially aligned in a plane extended in the radial direction. When the plug-in connector is installed in the housing, the sealing element thus exhibits a first axial sealing surface adjoining the sealing surface of the flange and adjoining a second axial sealing surface on the housing. The sealing element is thus arranged with the second area completely surrounding the pass-through opening of the housing between the mounting element and the housing.

According to a further preferred embodiment of the invention, the first area of the sealing element is connected with the second area of the sealing element on the second end face which is arranged distally to the first end face completely surrounding the opening for receiving the mounting element.

According to a preferred embodiment of the invention, the mounting element may be affixed to the housing. The flange of the mounting element preferably has pass-through openings to accommodate fasteners, in particular screws for screw connections. Each of the six fasteners, for example, is thus arranged to pass through a pass-through opening.

The seal arrangement may also be designed with an interlock connection configured as an electrical interlock that is coupled to the plug-in connectors of the plug-in connector in an electrically conductive manner. The interlock connection is advantageously fixed to the mounting element and may be integrated at least partially within the mounting element when assembled. The mounting element thus preferably has recesses which correspond to the outer shape of the interlock connection. The formations are preferably formed on a side of the mounting element that is oriented in the direction of the plug-in connectors and into a space enclosed by the housing. The interlock connection may therefore be integrated, inserted and fixed within the formations arranged in the mounting element.

The interlock connection is preferably formed by busbars for creating the electrical connection for the respective plug-in connectors. The busbars of the interlock connection, in particular arranged in pairs, are advantageously each U-shaped, wherein the legs of the U-shaped busbars are configured for electrically contacting the respective plug-in connectors.

The problem is also solved by a device according to the invention used to drive a compressor of a vaporous fluid, in particular an electric motor. The device comprises a rotor and a stationary stator which extend along a common longitudinal axis and a housing.

The stator is thus advantageously positioned radially on the outside of the rotor enclosing the rotor.

According to the design of the invention, the device is designed with a connection arrangement for the transmission of electrical energy and data with a seal arrangement according to the invention as described above for establishing electrical connections through the housing.

According to an embodiment design of the invention, the connecting arrangement is placed at a first end face of the stator aligned in an axial direction. The end face aligned in the axial direction is placed in a plane perpendicular to the longitudinal axis. The axial direction refers to the direction of the longitudinal axis of the stator, which also corresponds to the longitudinal axis and the axis of rotation of the rotor as well as the longitudinal direction of the plug-in connectors or the plug-in connector.

An advantageous embodiment of the invention permits use of the device to drive a compressor, in particular of an electric motor, in order to compress a vaporous fluid for a compressor in order to compress a refrigerant in a refrigerant circuit of a motor vehicle air conditioning system.

The seal arrangement according to the invention, or the device according to the invention for driving a compressor of a vaporous fluid with the seal arrangement have, in summary, a variety of other benefits:

Highly efficient corrosion protection for electrical plug-in connectors by extending the migration path for corrosive substances with installation space that is unchanged in comparison to the devices known from the state of the art;

A minimum number of components, in particular due to the single-piece design of the sealing element with axially and radially functions areas, wherein the distance between conventionally separated sealing elements is also used as a sealing surface, thus providing a more robust and secure seal arrangement;

Simple installation of the seal arrangement; and

Minimum effort in terms of installation time, material costs and manufacturing costs.

The seal arrangement according to the invention satisfies the high demands for corrosion resistance and service life, of electrical plug-in connectors in particular in the form of components integrated into a metal housing for use the automotive sector, in a cost-effective manner.

BRIEF DESCRIPTION OF DRAWINGS

Further details, features and advantages of embodiments of the invention are set out in the following description of alternative embodiments with reference to the corresponding drawings.

The figures show:

FIG. 1: a sectional view of an electrically driven compressor with an electric motor as a device for driving a compression mechanism;

FIG. 2: a first plug-in connector for establishing electrical connections of an electric motor as a device for driving a compressor of a vaporous fluid with separate sealing elements based on the state of the art in a side view, in a top view as well as in a perspective view;

FIG. 3: a second plug-in connector with a separate sealing elements from the state of the art in a sectional view;

FIG. 4: a plug-in connector according to the invention with a sealing element in a perspective view;

DETAILED DESCRIPTION OF AN EMBODIMENT

Figure 5A:
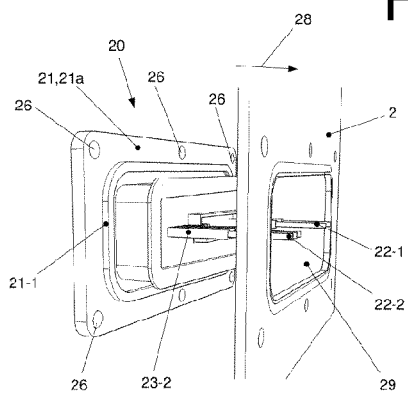
FIGS. 5A and 5B: the plug-in connector from FIG. 4 without a sealing element in combination with the housing of the compressor, in each case in a perspective exploded view.

FIG. 1 shows a sectional view of an electrically driven compressor 1 with an electric motor 3 arranged in a housing 2 as a device for driving a compression mechanism 4. The electric motor 3 is supplied with electrical energy via a switching device 5.

The electric motor 3 exhibits a stator 6 with an essentially hollow cylindrical stator core and coils wound around the stator core, and a rotor 7 arranged inside the stator 6. The rotor 7 is set into a rotating motion when electrical energy is supplied to the stator 6 coils via a connecting arrangement 8. The connecting arrangement 8 is formed at one end of the stator 6 and exhibits a plurality of electrical connections.

The support element 9 for holding connecting terminals with components of electrical connections between the coils of the electric motor 3 and the switching device 5 is arranged on the front side of the stator 6 that is formed via the connecting arrangement 8. The connection terminals are designed with electrically conductive, pin-shaped plug-in connectors, which connect the connecting lines of the coils with elements of the switching device 5 in an electrically conductive manner.

The rotor 7 is arranged coaxially inside the stator 6 and is rotatable around an axis of rotation. A drive shaft 10 can be arranged as an integral element with rotor 7 or as a separate element.

The electric motor 3 as well as the compression mechanism 4, comprising a scroll compressor with a fixed and an orbiting scroll, are arranged within the space enclosed by the housing 2. The housing 2 is formed from a first housing element to accommodate the electric motor 3 and a second housing element to accommodate the compression mechanism 4 and is preferably constructed of a metal, in particular aluminum.

The orbiting scroll of the compression mechanism 4, in which the vaporous fluid, especially a refrigerant, is compressed, is driven by the drive shaft 10 connected to the rotor 7 of the electric motor 3. According to another embodiment (not shown), the compression mechanism can also be designed with a swash plate.

The switching device 5 for controlling the operation of the electric motor 3 exhibits a circuit board 12 with various switching elements 11 and sockets. A variety of control circuits and components are installed and electrically connected on the circuit board 12 which are supplied electrical energy via power line from an external electrical source The sockets are used in particular to accept plug-in connectors as the electrical connection between the plug-in connectors and the circuit board.

FIGS. 2A to 2C show a side view, a top view and a perspective view of the first plug-in connector 20' for establishing electrical connections of an electric motor as a device for driving a compressor of a vaporous fluid with separate and thus segregated sealing elements 24a', 25' according to the state of the art, whilst FIG. 3 shows a sectional view of a second plug-in connector 20' with separate or segregated sealing elements 24b', 25' according to the state of the art.

The connector 20' for connecting the electrical connections of the electric motor exhibits a mounting element 21' for receiving plug-in connectors 22 for transmitting electrical energy. The plug-in connectors 22 are each arranged to be inserted into the mounting element 21' within a pass-through opening 23 and are thus arranged to pass through the mounting element 21'.

The mounting element 21' of the plug-in connector 20' is also designed with a first sealing element 24a', 24b' operating in the radial direction and a second sealing element 25' operating in the axial direction, which ensure protection against environmental influences, in particular corrosion, from the outside. The first sealing element 24a' of the first connector 20' is formed as a molded seal as shown in to FIGS. 2A to 2C and the first sealing element 24b' of the second plug in connector 20' is formed as an O-ring as shown in FIG. 3, whilst the second sealing elements 25' are each formed as a flat seal.

The mounting element 21' is connected to the housing via four fasteners, e.g., screws. Each screw is thus arranged to pass through a pass-through opening 26 formed in the mounting element 21'.

The plug-in connector 20' thus has, among other things, a plurality of fasteners and two separately mounted sealing elements 24a', 24b', 25', especially the first sealing element 24a', 24b' operating in the radial direction and the second sealing element 25' operating in the axial direction, and thus a plurality of components, which in turn require lengthy assembly time.

The specifications related to the radial and the axial direction each refer to the alignment of the plug-in connectors 22, which are aligned essentially parallel to each other in the longitudinal direction. The longitudinal direction of the connector 22 also corresponds to the axial direction of the connector 20'. The radial direction is each perpendicular to the longitudinal direction of the plug-in connectors 22 and thus to the axial direction of the plug-in connector 20'.

Figure 5B:
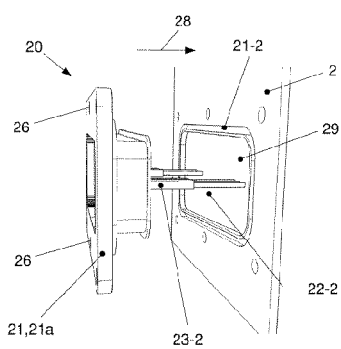

FIG. 4 shows a perspective view of a plug-in connector 20 for creating a plug-in connection with a sealing element 24, whilst FIGS. 5A and 5B show exploded perspective view of each of the plug-in connector from FIG. 4 without the sealing element 24 in combination with the housing 2 of the compressor.

The connector 20 includes a mounting element 21 as an integral component for transmitting electrical energy and data at different voltage levels ranges. The mounting element 21 is designed to accept first plug-in connectors 22-1 and second plug-in connectors 22-2.

The plug-in connectors 22-1, 22-2, each in the form of a straight pin, are each arranged to be inserted into the mounting element 21 within a pass-through opening 23-1, 23-2 and are thus arranged to pass through the mounting element 21. Each connector 22-1, 22-2 is circumferentially enclosed within the mounting element 21 via a pass-through opening 23-1, 23-2 and is thus tightly positioned with regard to the mounting element 21. The mounting element 21, with the pass through openings 23-1, 23-2, may be designed as a coherent unit and a single piece component, in particular as a single-piece injection molding element. Such single-piece construction is realized via the shaping process.

The plug-in connector 20 is includes a sealing element 24, which functions in both the radial and axial directions and thus ensures protection against environmental influences, especially corrosion, from the outside. Thus, the mounting element 21 is itself sealed through to the housing 2 in addition to plug-in connectors 22-1, 22 2 located within the pass-through openings running through the housing and to the exterior to the inverter and the circuit board respectively. The intrusion of corrosive substances into the space enclosed by housing 2 of the compressor is thus prevented.

The mounting element is designed with a flange with a sealing surface facing in the direction of the housing. The flange protrudes in radial direction from the mounting element, completely enclosing the mounting element. The sealing surface of is arranged in a plane that extends in a radial direction and points in an axial direction. The sealing element 24 adjoins an area operating in an axial direction on the sealing surface of the flange 21a of the mounting element 21.

The sealing element 24 intended a combined axial seal and radial seal is designed as a connected and thus single-piece component, preferably made of an elastomer.

The mounting element 21 is connected to the housing 2 via six fasteners, e.g., screws comprising screw connections. Each fastener, i.e. each screw, is arranged to pass through a pass-through opening 26 formed in the mounting element 21, in particular in the flange 21a of the mounting element 21.

An interlock connection 27, designed as an electrical interlock between the first plug-in connectors 22-1 and the second plug-in connectors 22-2 to control the transmission of electrical energy in the low-voltage range and in the high-voltage range, has busbars. The busbars, which are arranged in pairs and are each U shaped, are located inside the mounting element 21 when assembled. The legs of the U-shaped busbars are thus configured to be in electrical contact with the respective plug-in connectors 22-1, 22-2. The busbars of the interlock connection 27 are preferably designed as punched and formed plates.

The mounting element 21 has recesses on one side facing the plug-in connectors 22-1, 22-2, and thus facing the space enclosed by the housing 2, which correspond to the shapes of the busbars. This allows the individual busbars of interlock connection 27 to be integrated within the recesses formed in the mounting element 21. The busbars are inserted and affixed in the recesses of the mounting element 21.

When the busbars are inserted into the recesses of the mounting element 21, in particular clipped in the desired position, the busbars are simultaneously brought into electrical contact with the respective plug-in connectors 22-1, 22-2 and in this way electrically conductive connections are established between the corresponding plug-in connectors 22-1, 22-2 and the plug-in connectors 22-1, 22 2 are coupled in an electrically conductive manner.

The busbars of the interlock connection 27 are pre-assembled within the mounting element 21. The plug-in connector 20 is then inserted into the housing 2 of the compressor.

The plug-in connector 20 for transmitting electrical energy and data at different voltage ranges is inserted first into housing 2 during installation along with the plug-in connectors 22-1, 22-2 arranged in an axial direction in the mounting element in the direction of installation. The plug-in connector 20 is passed through pass-through opening 29 formed in the housing 2 with the sealing element 24 as well as the pre-assembled busbars of the interlock connection 27 with the plug plug-in connectors 22-1, 22-2 in front. Sockets for accommodating the connections 22-1, 22-2 are arranged on the circuit board (not shown).

When assembled, the single-piece sealing element 24, adjoins the mounting element 21 and the housing 2 in a radial direction in a first area within the pass through opening 29, whilst the sealing element 24 is arranged in the axial, and thus in the installation direction 28, with a second area completely surrounding the pass-through opening 29 between the mounting element 21 and the housing 2.

The mounting element 21 exhibits a flat area in the direction of an end face pointing away from flange 21a and a contour on the end face with a formation protruding out of the plane, which completely encloses the mounting element 21; this is shown in FIGS. 5A and 5B in particular. The formation secures the sealing element 24 against axial displacement during assembly or disassembly of the plug-in connector 20 on the housing 2.

The sealing element 24 exhibits an opening running in an axial direction for the insertion of the mounting element 21 with the plug plug-in connectors 22-1, 22-2 and the pass-through openings 23-1, 23-2 of the plug-in connectors 22-1, 22-2 Both the first area and the second area of the sealing element 24 are arranged completely surrounding the opening for the insertion of the mounting element 21.

The first area of the sealing element 24 exhibits a hollow cylindrical wall aligned in the axial direction with a free first end face and a second end face. When the plug-in connector 20 is installed in the housing 2, the inner surface of the wall adjoins the mounting element 21 as a first radial sealing surface, while the outer surface of the wall adjoins housing 2 as a second radial sealing surface.

The second area of the sealing element 24 is designed as a substantially flat seal aligned in a plane aligned in the radial direction, which, when the plug-in connector 20 is installed, adjoins, on the one hand, a first axial sealing surface on the sealing surface of the flange 21a on the mounting element 21 and, on the other hand, a second axial sealing surface on the housing 2.

The first area of the sealing element 24 is connected with the second area of the sealing element 24 on the second end face which is arranged distally to the first end face completely surrounding the opening for receiving the mounting element 21.

The second area of the sealing element 24 is designed as a labyrinth seal. The sealing surface of the flange 21a of the mounting element 21 thus exhibits a first contour 21-1 in the form of at least one fully circumferential recess and at least one fully circumferential formation. The recess in the form of a groove in the sealing surface with a depth aligned in the axial direction, and the formation or edge in the form of an elevation or edge protruding from the sealing surface with a height aligned in the axial direction, are arranged parallel to each other.

Next, in the area of the placement of the sealing surface of the flange 21a of the mounting element 21, the housing 2 exhibits a second contour 21-2, which is designed in the form of at least one recess which completely surrounds the pass through opening 29 and exhibits a depth aligned in the axial direction, and at least one shaped formation which completely surrounds the pass-through opening 29 and exhibits a height aligned in the axial direction and corresponds to the first contour 21-1 provided on the flange 21a of the mounting element 21. The recess of the first contour 21-1 thus interacts with the recess of the second contour 21 2 and the recess of the first contour 21-1 interacts with the recess of the second contour 21-2.

The second area of the sealing element 24 is arranged to fill and seal a gap formed between the contours 21-1, 21-2, in particular the recesses and formation corresponding to each other as tongue and groove.

The migration path for the corrosive substance between the housing 2 and the mounting element 21 is significantly extended compared to the use of a sealing element designed exclusively as a flat seal by means of formation of the contours 21-1, 21-2 and sealing the gap formed between the contours 21-1, 21-2, especially in the radial direction.

Figure 6A:
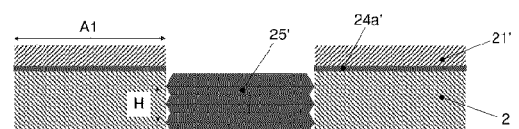
FIG. 6A: a detailed view of the sealing area between the housing of the compressor and the plug-in connector based on the state of the art in a perspective view.
Figure 6B:
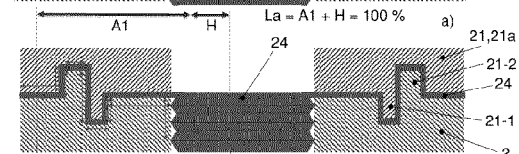
FIGS. 6B and 6C: a detailed view of the sealing area between the housing of the compressor and the plug-in connector when closed as well as opened, each in a sectional view.
Figure 6C:
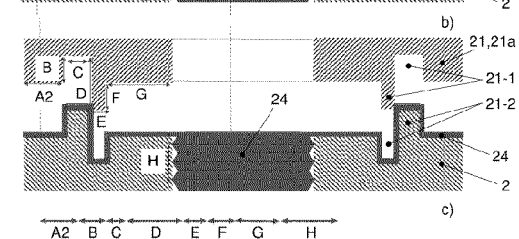

The arrangement of the sealing element 24 between the plug-in connection 20, in particular the mounting element 21, and the housing 2 with the extended migration path, especially for the corrosive substance, is shown in the FIGS. 6B and 6C which show a detailed view of the sealing area between the housing 2 of the compressor with the pass-through opening 29 for installation of the plug-in connector 20 and the plug-in connector 20 both closed and opened, each respectively in a sectional view. By comparison, FIG. 6A shows detailed view of the sealing area between the housing 2 of the compressor and the plug-in connector 20' based on the state of the art in a perspective view.

The radial sealing surfaces of the first area of the sealing element 24, and the axial sealing surfaces of the second area of the sealing element 24, are aligned substantially perpendicular to each other, in particular apart from the sections adjacent to contours 21-1, 21-2.

As shown in FIG. 6A, the migration path for the corrosive substance between the housing 2 and the mounting element 21' through the seal arrangement according to the state of the art comprises section A1 along the first sealing element 24a' and section H along the second sealing element 25'. The total length La of the migration route is indicated as 100%.

In comparison, the total length Lb of the migration path for the corrosive substance between the housing 2 and the flange 21a of the mounting element 21 is extended to about 150% via the seal arrangement according to the invention along the sealing element 24 as shown in FIGS. 6B and 6C. The migration path is thus composed of sections H of the first area as a radial seal of the sealing element 24, which corresponds to section H of the second sealing element 25' according to the state of the art, and sections A2, C, E and G of the second area as an axial seal of the sealing element 24, which in their entirety correspond to section A1 of the second sealing element 25' according to the state of the art.

In the area of the axial seal, the migration path of the seal arrangement according to the invention is extended by sections B, D and F, which each essentially correspond to the extent of one flank of the recesses or the formations of the contours 21-1, 21-2.

In light of the formation of the recesses and formations 21-1, 21-2 of the seal arrangement according to the invention, the corrosive substances, such as salt water, must cross a distance between sealing element 24 and housing 2 that is about 1.5 times greater compared to a sealing element from FIG. 6A with a flat sealing surface along the metal surface of the sealing surface, preferably an aluminum surface, of the housing 2 between the sealing element 24 and housing 2 in order to penetrate the space enclosed by the housing 2. This significantly extends the service life or functional life of the compressor, especially of the compressor components located in housing 2, while retaining the existing installation space.

REFERENCE NUMERAL LIST 1 compressor
2 housing
3 electric motor
4 compression mechanism
5 switching device
6 stator with stator core
7 rotor
8 connecting arrangement
9 support element
10 drive shaft
11 switching element
12 circuit board
20, 20' plug-in connector
21, 21' mounting element plug-in connector 20, 20'
21a flange mounting element 21
21-1 first contour flange 21a
21-2 second contour housing 2
22, 22-1, 22-2 plug-in connector
23, 23-1, 23-2 pass-through opening
24 sealing element
24a', 24b' first sealing element
25' second sealing element
26 pass-through opening fastener
27 interlock connection
28 mounting direction
29 pass-through opening housing 2
A1, A2, B-H section migration path
La, Lb length migration path

The invention claimed is:

1. A seal arrangement of a plug-in connection for establishing electrical connections through a housing, in particular of a device for driving a compressor, the seal arrangement comprising:
   a mounting element for accepting plug-in connectors to transfer electrical energy; and
   a sealing element arranged between the housing and the mounting element, wherein the mounting element is produced with a flange with a sealing surface that points in a direction of the housing, wherein the sealing surface of the flange includes a first contour and the housing includes a second contour around a pass-through opening in an area of the sealing surface, each in the form of at least one recess and formation that wrap around an entire perimeter of the pass-through opening, wherein the contours are produced and arranged in such a way that they correspond to one another and that the sealing element is produced as a single-piece component which wraps fully around the mounting element in a radial direction with a first section that acts in the radial direction, as well as with a second section that acts in the radial direction, wherein the sealing element is arranged with the second section between the sealing surface of the flange with the first contour and the housing with the second contour.

2. The seal arrangement according to claim 1, wherein the flange projects from the mounting element in the radial direction and covers an entire circumference of the mounting element, wherein the sealing surface of the flange is arranged and aligned on a plane fixed in the radial direction such that it points in an axial direction to the housing.

3. The seal arrangement according to claim 2, wherein the recess of the first contour or the second contour is a slot with a depth that is aligned in the axial direction.

4. The seal arrangement according to claim 3, wherein the formation of the first contour or the second contour is a section that is raised from a respective surface and whose height is aligned in the axial direction.

5. The seal arrangement according to claim 4, wherein the recess and the formation of the first contour or the second contour are arranged such that they run parallel to one another.

6. The seal arrangement according claim 2, wherein the sealing element is produced with an opening that runs in the axial direction for accepting the mounting element.

7. The seal arrangement according to claim 6, wherein the first section of the sealing element includes a hollow cylinder-shaped wall that is aligned in the axial direction with a first end face and a second end face.

8. The seal arrangement according to claim 7, wherein the second section of the sealing element is arranged and aligned on a fixed plane that is aligned in the radial direction, wherein the sealing element is arranged such that its second section is in contact with a first axial sealing surface on the sealing surface of the flange and with a second axial sealing surface on the housing when the plug-in connection is established.

9. The seal arrangement according to claim 8, wherein the first section of the sealing element on the second end face, produced distally to the first end face, is connected to the second section of the sealing element around a full circumference of an opening for accepting the mounting element.

10. The seal arrangement according to claim 1, wherein the plug-in connectors are each produced in the form of a straight pin.

11. The seal arrangement according to claim 1, wherein the mounting element is produced such that it can be fixed to the housing.

12. The seal arrangement according to claim 11, wherein the flange of the mounting element includes pass-through openings for attaching fixings, wherein each of the fixings is arranged such that it is guided through one of the pass-through openings.

13. The seal arrangement according to claim 1, wherein an interlock connection is produced as an electrical locking mechanism that is connected in an electrically conductive way to the plug-in connectors of the plug-in connection.

14. A device for driving the compressor of a vaporous fluid, in particular an electric motor, including the housing, as well as a stator and a rotor that are arranged along a common longitudinal axis, wherein a connection arrangement to transfer electrical energy and data is produced with the seal arrangement of the plug-in connection for establishing electrical plug-in connections through the housing according to claim 1.

15. The device according to claim 14, wherein the connection arrangement is produced on a first end face of the stator that is aligned in an axial direction.

16. Use of a device to drive the compressor, in particular the electric motor, for compressing the vaporous fluid, according to claim 14 for the compressor of a refrigerant in a refrigerant circuit of a motor vehicle air conditioning system.

* * * * *